(12) United States Patent
Miyatake

(10) Patent No.: US 7,969,635 B2
(45) Date of Patent: Jun. 28, 2011

(54) OPTICAL SCANNING DEVICE AND IMAGE FORMING APPARATUS USING SAME

(75) Inventor: Naoki Miyatake, Yokohama (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 12/881,671

(22) Filed: Sep. 14, 2010

(65) Prior Publication Data

US 2011/0063704 A1    Mar. 17, 2011

(30) Foreign Application Priority Data

Sep. 15, 2009 (JP) ................................. 2009-212691

(51) Int. Cl.
G02B 26/08 (2006.01)
(52) U.S. Cl. .................................................... 359/204.1
(58) Field of Classification Search ................ 359/204.1, 359/205.1, 216.1, 207.1
See application file for complete search history.

(56) References Cited

U.S. PATENT DOCUMENTS

| | | | |
|---|---|---|---|
| 5,680,254 A | 10/1997 | Ueda et al. |
| 6,317,245 B1 | 11/2001 | Hama et al. |
| 6,396,615 B1 | 5/2002 | Hama et al. |
| 6,621,512 B2 | 9/2003 | Nakajima et al. |
| 6,636,340 B1 | 10/2003 | Hama et al. |
| 6,771,300 B2 | 8/2004 | Amada et al. |
| 6,771,406 B2 | 8/2004 | Iizuka et al. |
| 6,781,728 B2 | 8/2004 | Hama et al. |
| 6,813,051 B2 | 11/2004 | Suzuki et al. |
| 6,937,374 B2 | 8/2005 | Iizuka et al. |
| 6,987,593 B2 | 1/2006 | Hayashi et al. |
| 7,050,082 B2 | 5/2006 | Suzuki et al. |
| 7,050,210 B2 | 5/2006 | Atsuumi et al. |
| 7,088,484 B2 | 8/2006 | Hayashi et al. |
| 7,161,724 B1 | 1/2007 | Miyatake |
| 7,167,288 B2 | 1/2007 | Miyatake et al. |
| 7,277,212 B2 | 10/2007 | Miyatake et al. |
| 7,385,181 B2 | 6/2008 | Miyatake et al. |
| 7,411,712 B2 | 8/2008 | Nakajima et al. |
| 7,538,925 B2 | 5/2009 | Miyatake |
| 7,551,337 B2 | 6/2009 | Hirakawa et al. |
| 7,633,663 B2 | 12/2009 | Hirakawa et al. |
| 7,643,193 B2 | 1/2010 | Nakamura et al. |
| 7,728,863 B2 | 6/2010 | Miyatake et al. |

(Continued)

FOREIGN PATENT DOCUMENTS

JP    2001-4948    1/2001

(Continued)

*Primary Examiner* — Euncha P Cherry
(74) *Attorney, Agent, or Firm* — Oblon, Spivak, McClelland, Maier & Neustadt, L.L.P.

(57) ABSTRACT

The optical scanning device includes a light source emitting multiple light beams; an optical deflecting device having a reflection surface on which the light beams are incident to be reflected while deflected; multiple scanning optics systems focusing the light beams on the surfaces of members to be scanned while scanning the surfaces with the light beams in a main scanning direction; and multiple glass plates located between the multiple scanning optical systems and the members on the light paths while slanted and having no refracting power in the main and sub-scanning scanning directions. The light beams include two or more light beams having different incidence angles in the sub-scanning direction relative to the normal line of the reflection surface of the optical deflecting device, and the slanting angles of the glass plates are determined depending on the incidence angles of the corresponding light beams passing through the glass plates.

15 Claims, 5 Drawing Sheets

U.S. PATENT DOCUMENTS

| | | |
|---|---|---|
| 7,729,031 B2 | 6/2010 | Nakamura et al. |
| 2004/0036937 A1 | 2/2004 | Hama et al. |
| 2004/0184127 A1* | 9/2004 | Nakajima et al. ............. 359/204 |
| 2007/0216754 A1 | 9/2007 | Miyatake |
| 2008/0068691 A1 | 3/2008 | Miyatake |
| 2008/0180772 A1 | 7/2008 | Miyatake et al. |
| 2008/0192319 A1 | 8/2008 | Miyatake et al. |
| 2009/0073528 A1 | 3/2009 | Miyatake |
| 2009/0168132 A1 | 7/2009 | Miyatake |
| 2010/0091083 A1 | 4/2010 | Itami et al. |

FOREIGN PATENT DOCUMENTS

| | | |
|---|---|---|
| JP | 2001-10107 | 1/2001 |
| JP | 3295281 | 4/2002 |
| JP | 2003-5114 | 1/2003 |
| JP | 3841299 | 8/2006 |
| JP | 3851469 | 9/2006 |
| JP | 3877212 | 11/2006 |

* cited by examiner

OPTICAL SCANNING DEVICE AND IMAGE FORMING APPARATUS USING SAME

BACKGROUND OF THE INVENTION

1. Field of the Invention

The present invention relates to an optical scanning device for scanning a member with a light beam, and to an image forming apparatus such as a digital copier, a laser printer, and a laser facsimile machine using the optical scanning device.

2. Discussion of the Related Art

Optical scanning devices used for digital image forming apparatuses such as copiers, laser printers, and laser facsimile machines typically have a configuration such that a light beam emitted by a light source is deflected by an optical deflecting device, and the deflected light beam is then focused upon a surface of a member (such as a photoreceptor) by a scanning optical system such as fθ lenses to form a light spot thereon while scanning the member with the light beam in a main scanning direction.

There are full-color image forming apparatuses such that light beams emitted by plural light sources are deflected by an optical deflecting device; the deflected light beams are then focused upon surfaces of respective photoreceptors at the same time to form electrostatic latent images on the photoreceptors; the electrostatic latent images are developed with respective color developers having different colors such as yellow, magenta, cyan, and black color developers to form separate visible color images; the visible color images are sequentially transferred onto a recording sheet to form a combined multi-color image; and the combined multi-color image is fixed to the recording sheet by a fixing device to form a full color image. Among such color image forming apparatuses, tandem color image forming apparatuses using two or more sets comprised of an optical scanning device and a photoreceptor to produce multi-color images or full color images are well known. In particular, a tandem color image forming apparatus using a single optical deflecting device for forming electrostatic images on two or more photoreceptors is proposed as an example of such a tandem color image forming apparatus. Such a configuration can reduce the complexity and thus the cost as well as the overall size of the image forming apparatus overall.

Specific examples of such a tandem color image forming apparatus include the following:

(1) An optical scanning device in which multiple substantially parallel light beams separated in a sub-scanning direction are guided to an optical deflecting device to be deflected, and the deflected multiple light beams are guided to respective optical scanning elements to scan photoreceptors with the light beams; and (2) An optical scanning device in which multiple light beams are guided to one side of an optical deflecting device, the deflected multiple light beams are converged in a sub-scanning direction by a first optical system, the multiple light beams are then converged in a main scanning direction by a second optical system, and the multiple light beams are guided to respective photoreceptors after passing mirrors and respective third optical systems deployed on the photoreceptors.

As another example of optical scanning devices using only one optical deflecting device to reduce costs thereof, an optical scanning device using an oblique incidence type optical system in which multiple light beams are guided to a surface of a deflecting device at different angles in the sub-scanning direction is known. In the oblique incidence type optical scanning device, multiple light beams deflected by the surface of the deflecting device are guided to surfaces of respective photoreceptors after being separated by a reflecting mirror or the like. In this regard, the angle of the light beams in the sub-scanning direction (i.e., the angle of the light beams incident on the surface of the optical deflecting device) is set to an angle at which the light beams can be separated from each other by such a reflecting mirror. By using such an oblique incidence type optical scanning device, multiple light beams can be separated without increasing the size of an optical deflecting device (i.e., without increasing the length of a polygon mirror in the sub-scanning direction).

Recently, in an attempt to produce high quality images, image forming apparatuses producing not only yellow, magenta, cyan and black color images, but also one or more other color images such as white toner images and transparent toner images using four photoreceptors (i.e., without increasing the number of photoreceptors) have been proposed. Although the number of photoreceptors is not increased in these image forming apparatuses, there is no space for an additional image forming module around a photoreceptor. Therefore, it is preferable to increase the number of photoreceptors so as to correspond to the number of color images produced.

To achieve low-cost, space-saving, and energy-efficient optical scanning devices for use in full color image forming apparatuses, oblique incidence type optical scanning devices are preferably used. However, oblique incidence type optical scanning devices have a drawback of causing scanning line bending such that the scanning light beams undergo a marked bending, resulting in formation of a misaligned multi-color image in which one or more color images are formed at positions different from the target positions thereof. The amount of bending of a scanning light beam varies depending on the oblique incidence angle of the light beam in the sub-scanning direction.

In a color image forming apparatus in which the number of photoreceptors is increased so as to be five or more to produce high quality images, not only the costs and size of the optical scanning device but also the costs and the size of the image forming apparatus as a whole are increased. In general, among various optical elements of an optical scanning device, the polygon mirror is more costly than the other optical elements. Even when using an optical scanning device having only one optical deflecting device, the optical deflecting device has to have a multi-tiered polygon mirror in which three or more polygon mirrors are overlaid in the sub-scanning direction to deflect multiple light beams toward respective photoreceptors, resulting in an increase in size of the optical deflecting device.

For these reasons, there is a need for an oblique incidence type optical deflecting device which has a low oblique incidence angle to prevent any increase in the amount of bending of a scanning light beam and wave aberration thereof, and which has low costs while saving space and energy.

SUMMARY

This patent specification describes a novel optical scanning device, one embodiment of which includes a light source configured to emit multiple light beams, an optical deflecting device having a reflection surface to which the multiple light beams are incident and from which the multiple light beams are reflected to be deflected, multiple scanning optics systems configured to focus the deflected multiple light beams on the surfaces of corresponding members to be scanned while scanning the surfaces with the light beams in a main scanning direction, and multiple glass plates, which are located between the multiple scanning optical systems and the members to be scanned while being deployed on light paths of the corresponding light beams and each of which has no refracting power in the main and sub-scanning directions and is slanted at an angle relative to an axis perpendicular to the light path of the corresponding light beam. The multiple light beams include two or more light beams having different incidence angles in the sub-scanning direction relative to the normal line of the reflection surface of the light deflecting device. The slanting angles of the glass plates are determined depending on the incidence angles of the corresponding light beams passing through the glass plates.

This patent specification further describes a novel image forming apparatus, one embodiment of which includes multiple image bearing members, and the above-mentioned optical scanning device configured to scan the surfaces of the multiple image bearing members with corresponding multiple light beams to form an electrostatic latent image on each of the image bearing members.

BRIEF DESCRIPTION OF THE DRAWINGS

A more complete appreciation of the aspects of the invention and many of the attendant advantage thereof will be readily obtained as the same better understood by reference to the following detailed description when considered in connection with the accompanying drawings, wherein.

DESCRIPTION OF THE PREFERRED EMBODIMENTS

The optical scanning device and the image forming apparatus of the present invention will be described with reference to drawings.

Figure 1A:
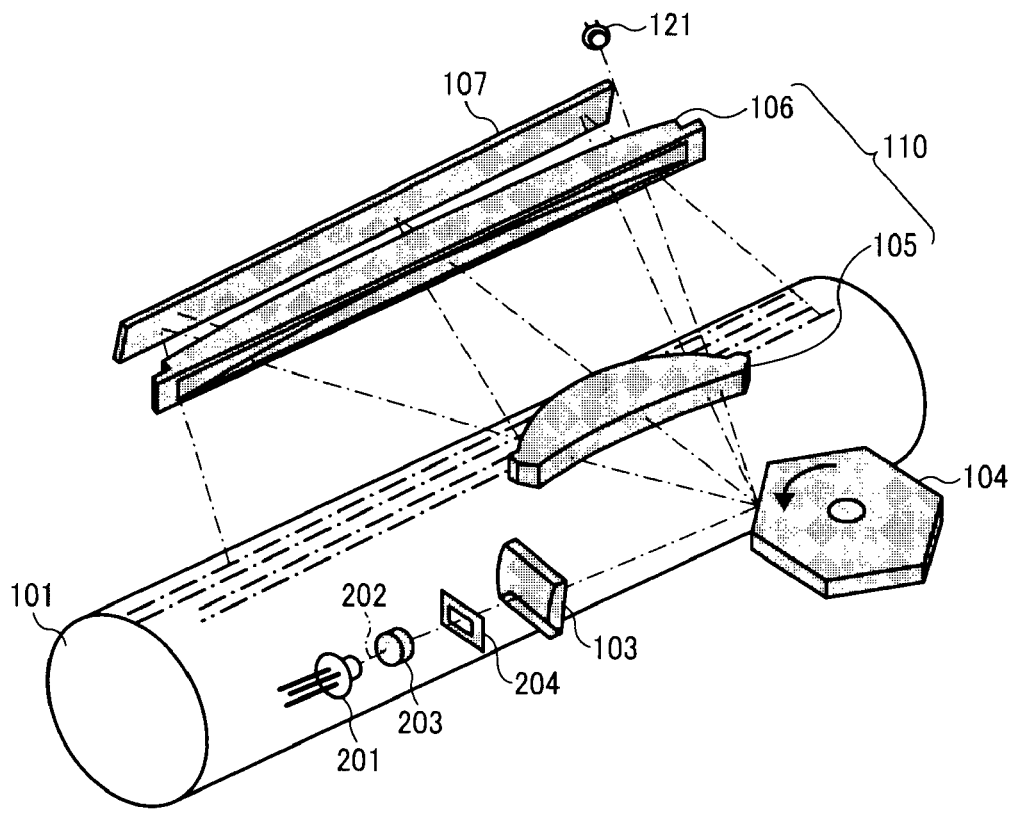
FIGS. 1A and 1B are schematic views illustrating an embodiment of the optical scanning device of the present invention.
Figure 1B:
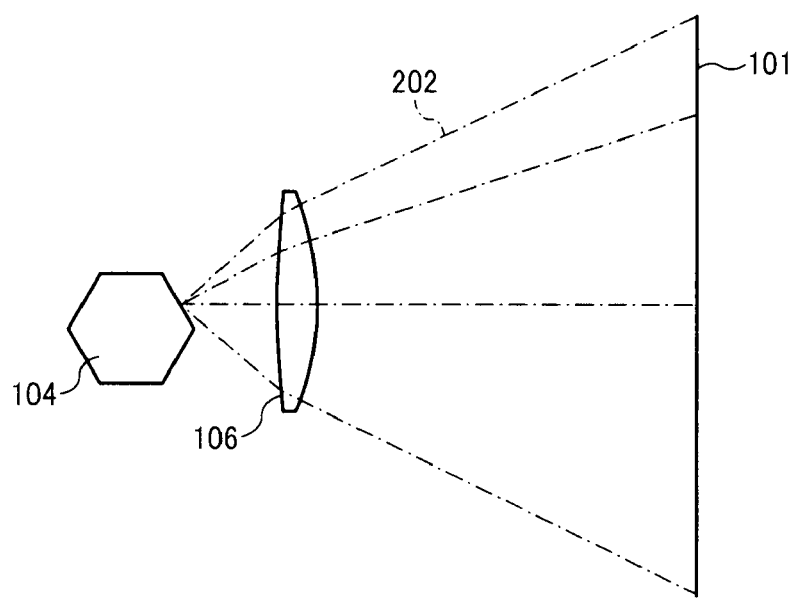

FIGS. 1A and 1B illustrate an embodiment of the optical scanning device of the present invention.

In the optical scanning device illustrated in FIGS. 1A and 1B, a divergent light beam 202 emitted by a laser diode 201 serving as a light source is converted by a coupling lens 203 to achieve a beam state suitable for an optics system set thereafter. In this regard, the beam state can be a parallel state, a slightly divergent state, or a slightly focused state. After the light beam 202 passing the coupling lens 203 passes an aperture 204, the light beam is focused in a sub-scanning direction by a cylindrical lens 103, followed by striking a deflecting reflection surface (hereinafter reflection surface) of a rotating polygon mirror 104 (hereinafter sometimes referred to as an optical deflecting device). In this regard, since the reflection surface of the polygon mirror 104 is rotated at a constant speed, the light beam 202 reflected from the reflection surface of the polygon mirror is deflected at a constant angular speed. The thus-deflected light beam 202 passes through a scanning optics system 110 including a first lens 105 and a second lens 106, followed by being reflected by a reflection mirror 107, resulting in focusing of the light beam (i.e., formation of a light spot) on a scanning surface of a photoreceptor drum 101. Thus, the surface of the photoreceptor drum 101 is scanned with the deflected light beam 202. Reference numeral 121 in FIG. 1A denotes a synchronization detector.

Figure 2:
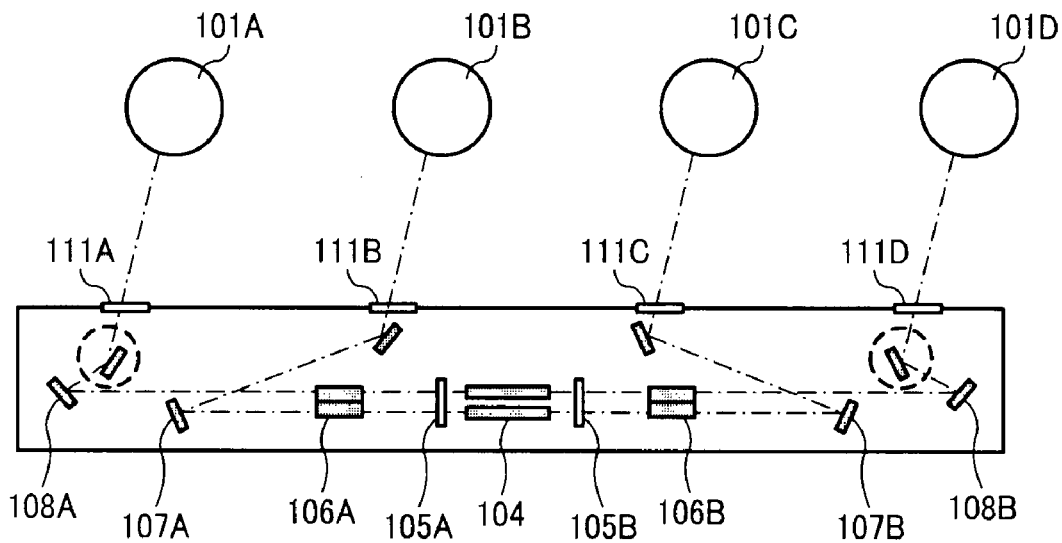
FIG. 2 is a schematic cross-sectional view illustrating a counter scanning type optical scanning device.

FIG. 2 illustrates a counter scanning type optical scanning device. The optical scanning device includes the polygon mirror 104, first lenses 105A and 105B, second lenses 106A and 106B, reflecting mirrors 107A, 1073, 108A and 108B, and glass plates 111A-111D. Reference numerals 101A-101D denote photoreceptors.

Figure 3A:
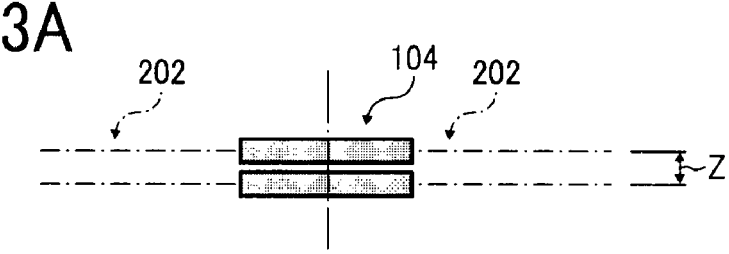
FIGS. 3A-3C are schematic cross-sectional views illustrating light beams incident on polygon mirrors.
Figure 3B:
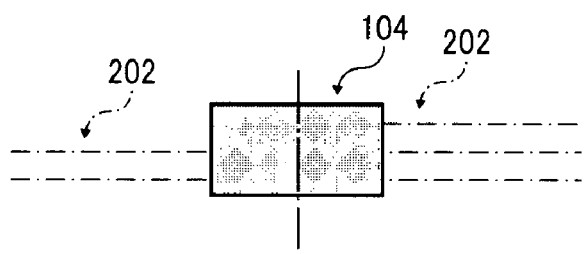

The polygon mirror 104 of a counter optical scanning device illustrated in FIG. 2 is a two-tiered polygon mirror as illustrated in FIG. 3A, in which two thin polygon mirrors are stacked vertically at a distance Z so that the light beams can be securely separated from each other so as to be guided to respective scanning surfaces of the photoreceptors 101A-101D. Alternatively, instead of such a two-tiered polygon mirror, a single polygon mirror as illustrated in FIG. 3B can be used for the polygon mirror 104. However, when the thickness of the polygon mirror in the sub-scanning direction increases, the area of the surface of the polygon mirror contacted with air increases, resulting in an increase in the electrical power consumption of the polygon mirror due to windage loss, and increase of noise and costs of the polygon mirror. In addition, in an image forming apparatus having five or more photoreceptors to additionally form a transparent toner image and/or a color toner image other than yellow, magenta, cyan and black color toners, the thickness of the polygon mirror has to be further increased, thereby further increasing the costs of the polygon mirror and making it impossible to rotate the polygon mirror at high speed. Further, instead of the two-tiered polygon mirror, a three-tiered polygon mirror, not illustrated, can also be used. However, since such a three-tiered polygon mirror has a complex structure and is costly to manufacture.

Therefore, the optical scanning device of the present invention uses oblique light beams incident on the reflection surface of a polygon mirror at different angles relative to a normal line of the reflection surface and a horizontal light beam incident on the reflection surface in parallel with the normal line. This embodiment of the optical scanning device uses five light beams with which the surfaces of five corresponding photoreceptors are scanned.

Figure 3C:
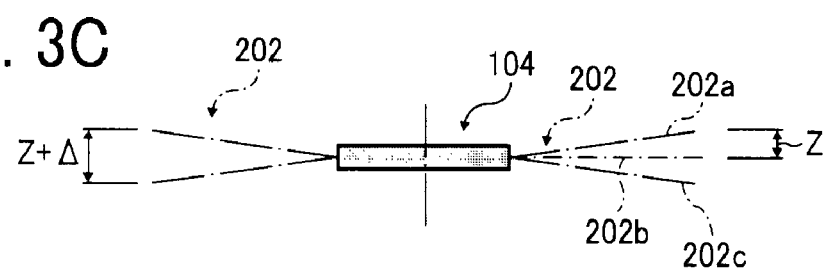

FIG. 3C is a cross-sectional view illustrating the polygon mirror 104 of the embodiment of the optical scanning device. As illustrated in FIG. 3C, two light beams 202 are incident on a reflection surface (on the left side of the polygon mirror) to be guided to two different photoreceptors while three light beams 202a, 202b, and 202c are incident on an opposite reflection surface (on the right side of the polygon mirror) to be guided to three different photoreceptors other than the first two photoreceptors. In this regard, in FIG. 3C the vertical direction is the sub-scanning direction. Among the three light beams 202a, 202b, and 202c, the light beam 202b is guided so as to be incident on the reflection surface while being parallel to the normal line of the reflection surface so that the other light beams 202a and 202c can have a minimum oblique incidence angle.

Thus, the optical scanning device illustrated in FIG. 3C has oblique incidence optical systems at the left side of the polygon mirror for scanning even-numbered (two) photoreceptors with two light beams having different oblique incidence angles, and obliquely and horizontally incident optical systems at the right side of the polygon mirror for scanning odd-numbered (three) photoreceptors with two light beams having different oblique incidence angles and one horizontally incident light beam. Therefore, it is possible to use only a single thin polygon mirror for the polygon mirror 104, thereby preventing increase of costs of the optical deflecting device, which has a relatively high cost ratio in the optical scanning device, while decreasing the electrical power consumption and noise of the optical scanning device. Thus, an environmentally-friendly optical scanning device can be provided. In this optical scanning device, the oblique incidence angle of the light beams obliquely incident on the polygon mirror 104 can be minimized.

Next, the optics system for the oblique incidence type optical scanning system will be described in detail.

A light beam emitted by the light source 201 is obliquely incident on the reflection surface of the polygon mirror 104 relative to a horizontal plane including the normal line of the reflection surface, and the light beam reflected from the reflection surface is also oblique relative to the horizontal plane. Such a light beam having an oblique incidence angle can be formed, for example, by obliquely arranging the optical axis of the laser diode 201, the coupling lens 203, and the cylindrical lens 103 relative to the horizontal plane, by using a reflecting mirror for reflecting a light beam so as to obtain an oblique incidence angle, or by slanting the optical axis of the cylindrical lens 103 relative to the light beam moving direction.

In conventional oblique incidence type optical scanning devices, a light beam having an oblique incidence angle in the sub-scanning direction is obliquely incident on lenses of a scanning optics system 110 (illustrated in FIG. 1A) in the sub-scanning direction. Therefore, the optical property of the light beam deteriorates due to accumulation of various aberrations.

As mentioned above, oblique incidence type optical scanning devices have a drawback in that scanning line bending is large. In this regard, the amount of scanning line bending of a light beam varies depending on the oblique incidence angle of the light beam. When multiple color images are formed using an oblique incidence type optical scanning device using multiple light beams having different oblique incidence angles and then the color images are overlaid, a misaligned multi-color image is formed as mentioned above. In addition, a light beam having an oblique incidence angle is incident on a scanning lens while twisted, resulting in increase of wave aberration, thereby degrading the optical property of the light beam particularly at a large image height. In this case, light spots formed by such a light beam widen, thereby forming low-resolution images.

The mechanism of occurrence of scanning line bending will be described in detail.

For example, if the incident plane of a scanning lens having a large refracting power in the sub-scanning direction (e.g., the second lens 106 illustrated in FIG. 1A of the scanning optical system 110) does not have an arch form having a center at the reflection point of the polygon mirror 104 from which a light beam is reflected, the distances between the reflection point of the polygon mirror and the incident points on the surface of the scanning lens are different from each other because the thickness of the scanning lens is different in the main scanning direction. However, in general, it is difficult for a scanning lens to have such an arch form because the optical property of the lens deteriorates. Namely, as illustrated in FIG. 1B, the light beam 202 deflected from the polygon mirror 104 is not incident on the incident surface of the second lens 106, i.e., is incident thereon while having a certain incidence angle.

In a case in which a light beam is horizontally incident on the reflection surface of the polygon mirror 104 like the light beam 202b, the reflected light beam moves horizontally relative to the scanning lens and therefore the positions of the incident points of the scanning lens in the sub-scanning direction do not change even when the distances between the reflection point of the polygon mirror and the incident points on the surface of the scanning lens are different. Therefore, the scanning line bending problem is not caused. However, in a case in which a light beam is obliquely incident on the reflection surface of the polygon mirror 104 at a certain incidence angle in the sub-scanning direction like the light beam 202a or 202c, the distances between the reflection point of the polygon mirror 104 and the incident points of the surface of the second lens 106 are different depending on the image height. Specifically, the positions of the incident points shift to higher or lower positions (depending on the incidence angle of the light beam) in the sub-scanning direction as the incident points are farther apart from the center of the second lens. As a result, when the light beam 202a or 202c passes through the second lens 106, which has a large refractive power in the sub-scanning direction, the light beam is subjected to different refractive powers in the sub-scanning direction, resulting in occurrence of scanning line bending.

In order to correct scanning line bending, a lens having a special scanning surface is preferably used for the second lens 106. Specifically, the special scanning surface is a surface that has no curvature in the sub-scanning direction and whose slope in the sub-scanning direction varies in the main scanning direction. Namely, the special scanning surface has a form asymmetric in the sub-scanning direction, and is represented by the following equation (1):

$$X(Y,Z) = Y^2 \cdot Cm / \{1 + \sqrt{[1-(1+K)\cdot(Y\cdot Cm)^2]} + A\cdot Y^4 + B\cdot Y^6 + C\cdot Y^8 + D\cdot Y^{10} + E\cdot Y^{12} \ldots + Cs(Y)\cdot Z^2 / \{1 + \sqrt{[1-(Cs(Y)\cdot Z)^2]} + (F0 + F1\cdot Y + F2\cdot Y^2 + F3\cdot Y^3 + F4\cdot Y^4 + \ldots)Z \quad (1)$$

It is to be noted that the special scanning surface is not limited to such an equation, and alternatively can also be represented by another equation.

In equation (1), $Cm = 1/RY$ and $Cs(Y) = 1/RZ$, wherein RY represents a paraxial curvature radius in a main scanning cross-sectional plane which is parallel to a flat cross-sectional plane including the optical axis, Y represents a distance from the optical axis in the main scanning direction, each of A, B, C, D, . . . represents a high degree coefficient, RZ represents a paraxial curvature radius in a sub-scanning cross-sectional plane perpendicular to the main scanning cross-sectional plane, and $(F0 + F1\cdot Y + F2\cdot Y^2 + F3\cdot Y^3 + F4\cdot Y^4 + \ldots)Z$ represents the amount of tilt, wherein when the amount of tilt is 0, all of F1, F2 . . . are 0, and when F1, F2 . . . are not 0, the amount of tilt changes in the main scanning direction.

Thus, in the scanning lens having such a special scanning surface, a proper amount of tilt, which is different in the main scanning direction, is applied to the scanning lens, and thereby scanning line bending of a light beam in the sub-scanning direction can be corrected. Since the light beam is focused in this case, increase of wave aberration at the special scanning surface can be minimized.

Next, the wave aberration will be described in detail.

In order to satisfactorily correct wave aberration and scanning line bending, it is preferable to use at least two scanning lenses, one of which is arranged closer to the polygon mirror 104 (such as the first lens 105) and which has a concave surface whose concavity in the sub-scanning direction increases toward the ends thereof to correct wave aberration, and another of which is arranged closer to the member to be scanned (i.e., the photoreceptor) and which has a large refractive power in the sub-scanning direction to correct scanning line bending. Thus, by using functionally separated scanning lenses, the beam spot diameter can be further decreased while reducing the amount of scanning line bending. Needless to say, instead of such functionally separated scanning lenses, combinations of scanning lenses each partially correcting wave aberration and scanning line bending can also be used.

When the scanning lenses have such configurations, different negative powers can be properly imparted to the scanning lens in the main scanning direction, thereby making it possible to correct twisting in a light beam, resulting in decrease of positional variation of light spots on the scanning surface of a member to be scanned. Wave aberration can be improved by correcting the incident position on the scanning lens closer to the scanning surface.

Figure 4:
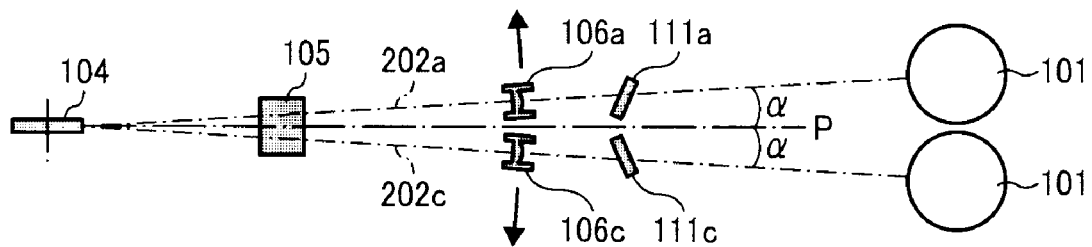
FIG. 4 is a schematic view illustrating relative positions of a polygon mirror, scanning optics systems, and glass plates of an embodiment of the optical scanning device of the present invention, and photoreceptors to be scanned.

In this embodiment of the optical scanning device, as illustrated in FIG. 4 and Embodiments below, the scanning optics system 110 is a two-lens system, one of which is the first lens 105 arranged closer to the polygon mirror 104 and used for both the obliquely incident light beams 202a and 202c, and the other of which includes two second lenses 106a and 106c respectively used for the obliquely incident light beams 202a and 202c. Each of the second lenses 106a and 106c has such a special scanning surface as mentioned above to correct main scanning line bending. The first lens 105 has a surface in which the negative power increases from the center thereof to the ends thereof in the sub-scanning direction to adjust the incident position of the light beam on the second lenses 106a and 106c in the sub-scanning direction, thereby correcting wave aberration.

The two second lenses 106a and 106c have the same form, but are arranged in such a manner that the upper side of one of the second lens 106a in the sub-scanning direction corresponds to the lower side of the other second lens 106c as illustrated by two arrows in FIG. 4. Namely, the special scanning surfaces of the second lenses 106a and 106c are symmetric relative to a standard plane indicated by a broken line P in FIG. 4. Therefore, even when the sign of the incidence angle α of the light beams 202a and 202c is different (i.e., plus or minus), scanning line bending can still be satisfactorily corrected.

Similarly, when the positions of the points of the first lens 105, through which the light beams 202a and 202c pass, are symmetric relative to the standard plane, wave aberration can be satisfactorily corrected.

Scanning line bending is also caused by glass plates 111a and 111c, each disposed between a scanning lens and a member to be scanned. Each of the glass plates 111a and 111c is used for preventing entering of dust and toner into a casing containing the scanning lenses 105 and 106 and the polygon mirror 104. As illustrated in FIG. 4, each of the glass plates 111a and 111c is slanted relative to the light beam moving direction to prevent the light beam from being reflected from the glass plate and returned to the light source, resulting in occurrence of malfunction.

Therefore, the length of the light path of the light beam 202a (or 202c) in the glass plate changes in the main scanning direction, thereby causing scanning line bending. Namely, although the glass plates 111a and 111c have no power, the light beams are emitted therefrom shifted in the sub-scanning direction when the glass plates are slantingly set, and the amount of the shift varies in the main scanning direction, thereby causing scanning line bending.

Thus, even when scanning line bending caused by the obliquely incident light beams 202a and 202c is corrected by the above-mentioned special scanning surface, scanning line bending is caused if the glass plates 111a and 111c are slanted relative to the sub-scanning direction. Therefore, it is preferable for the above-mentioned special scanning surface to perform correction while considering the scanning line bending to be caused by the slantingly set glass plates 111a and 111c.

Similarly to the second lenses 106a and 106c, the glass plates 111a and 111c are set symmetrically relative to the standard plane P so that scanning line bending can be satisfactorily corrected even when the sign (plus and minus) of the oblique incidence angle α of the light beams 202a and 202c is different.

As mentioned above, by using a special scanning surface for a scanning lens of an oblique incidence optical system, degradation of optical properties such as scanning line bending and wave aberration specific to such an oblique incidence optical system can be decreased. In addition, by decreasing the oblique incidence angle α (i.e., an angle relative to the normal line of the reflection surface of the polygon mirror 104), degradation of the optical properties can be decreased. Therefore, the optical system has good optical properties.

In addition, in this embodiment of the optical scanning device of the present invention, a second lens (106a or 106c) having the same form is used for each of the two obliquely incident light beams 202a and 202b, and the horizontally incident light beam 202b parallel to the normal line of the reflection surface of the polygon mirror 104. Therefore, management of the parts (second lens) can be easily performed and increase of costs can be prevented.

However, conversely, applying the special scanning surface used for the second lens 106a (or 106c) to correct scanning line bending to a second lens 106b (illustrated in FIG. 5A) used for the horizontally incident light beam 202b causes scanning line bending at the special scanning surface of the second lens. This is because the horizontally incident light beam 202b hardly causes scanning line bending in the first place, and when a special scanning surface is applied to the second lens 106b, scanning line bending is caused.

Figure 5A:
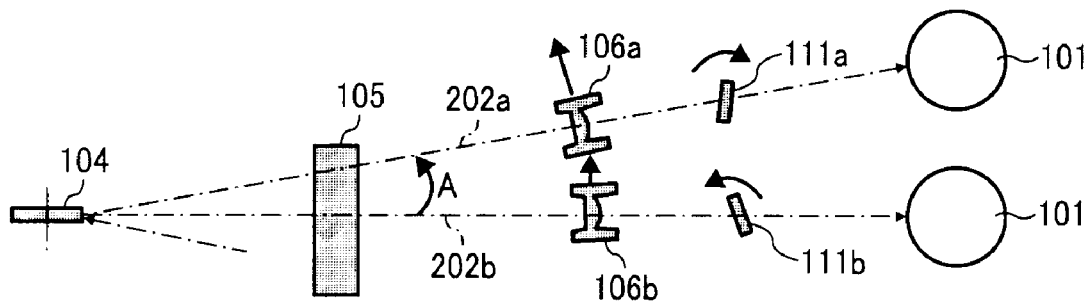
FIGS. 5A and 5B are schematic views illustrating relative positions of a polygon mirror, scanning optics systems, and glass plates of another embodiment of the optical scanning device of the present invention, and photoreceptors to be scanned.

Therefore, in the optical scanning device of the present invention, when it is assumed that a second lens (such as second lens 106) and a glass plate (such as glass plate 111) are provided for the light beams 202a and 202b, the second lens for the horizontally incident light beam 202b is set in the same way as that for the obliquely incident light beam 202a (as illustrated in FIG. 5A). In addition, the slanting direction of a glass plate 111b relative to the moving direction of the horizontally incident light beam 202b is the same as the reflection direction (i.e., a direction A in FIG. 5A) of the obliquely incident light beam 202a at the reflection surface.

Specifically, in a combination optical system including an oblique incidence optical system for the obliquely incident light beam 202a including the first lens 105 and the second lens 106a, and a horizontal incidence optical system for the horizontally incident light beam 202b including the first lens 105 and second lens 106b as illustrated in FIG. 5A, the special scanning surface of the second lens 106b for the horizontally incident light beam is arranged in the same manner as that of the second lens 106a for the obliquely incident light beam in the sub-scanning direction (i.e., the second lenses 106a and 106b, which have a form asymmetric in the sub-scanning direction, are set such that the special scanning surfaces thereof face in the same direction) as illustrated by same-direction arrows for the second lenses 106a and 106b in FIG. 5A. As illustrated in FIG. 5A, the slanting direction of the glass plate 111b for the horizontally incident light beam 202b relative to the moving direction of the horizontally incident light beam is the same as the reflection direction (direction A (counterclockwise) in FIG. 5A) of the obliquely incident light beam 202a at the reflection surface.

Figure 5B:
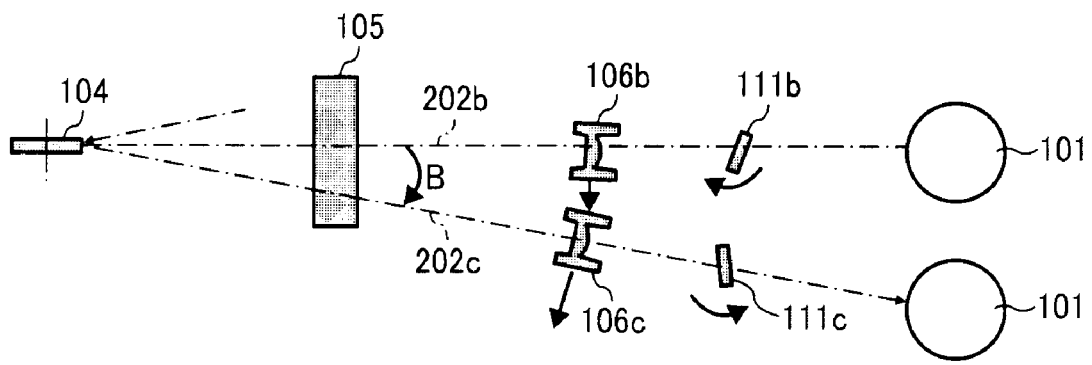

When the special scanning surface of the second lens 106b for the horizontally incident light beam 202b is arranged so as to be the same as that of the second lens 106c for the obliquely incident light beam 202c in the sub-scanning direction as illustrated in FIG. 5B, the slanting direction of the glass plate 111b for the horizontally incident light beam 202b relative to the moving direction of the horizontally incident light beam is the same as the reflection direction (direction B (clockwise) in FIG. 5B) of the obliquely incident light beam 202c at the reflection surface.

In the optical scanning device having such a configuration, scanning line bending can be corrected even when the device including a combination optical system including an obliquely incident optical system, and a horizontally incident optical system. The reason therefor is as follows.

Specifically, scanning line bending caused by the glass plate 111 is relatively small compared with scanning line bending caused by the oblique incidence optics system (i.e., lenses) for the light beams 202a and 202c, but is not cancelled. In such an oblique incidence optical system, the direction of correction at the special scanning surface of the second lenses 106a and 106c is the same independently of the slanting direction of the glass plate 111. In addition, the amount of scanning line bending caused by the second lens 106b provided for the horizontally incident light beam 202b changes depending on the slanting angle of the glass plate 111b, but the direction of scanning line bending (whether the scanning line bending is convex upward or downward) does not change depending on the slanting angle.

Namely, by adjusting the slanting angle of the glass plate 111b for the horizontally incident light beam 202b relative to an axis perpendicular to the moving direction of the horizontally incident light beam, scanning line bending caused by the second lens 106b can be canceled, thereby decreasing the effects of the second lens.

In this regard, the glass plates 111 have a thickness of about 2 mm and the slanting angles thereof are 10° to 30°. When the thickness is greater than 10 mm, the amount of scanning line bending seriously increases. In addition, costs thereof increase while design problems ensue, and therefore it is not practical.

As mentioned above, even when a second lens having the same form is used for the oblique incidence optical system and the horizontal incidence optical system, occurrence of scanning line bending can be prevented by slanting the glass plate 111 at a proper angle, thereby preventing formation of a misaligned multi-color image. In addition, by using a combination of an oblique incidence optical system and a horizontal incidence optical system, a low-cost, space-saving and energy-saving optical scanning device can be provided even when the number of members to be scanned (i.e., photoreceptors) increases.

In the above-mentioned embodiment of the optical scanning device, a combination of a horizontal incidence optical system and an oblique incidence optical system is used for scanning the surfaces of five photoreceptors. However, this technique can also be used for optical scanning devices for scanning the surfaces of four photoreceptors, or six or more photoreceptors.

Practical optical scanning devices typically use a reflecting mirror for a scanning optical device thereof. When using the above-mentioned technique for such optical scanning devices while assuming that only a second lens and a glass plate are provided on a light path of each of respective light beams (such as light beams 202a and 202b) so as to be located between a polygon mirror and a scanning surface, the slanting angle of each glass plate is properly adjusted, and a reflecting mirror is properly arranged for each of the light beams while maintaining the optical positional relation therebetween. A common-use lens (such as first lens 105) to be provided closer to the polygon mirror 104 can be commonly used by the horizontal incidence optical system and the oblique incidence optical system without problems as mentioned below in Embodiments.

Next, a second embodiment of the optical scanning device of the present invention will be described.

Figure 6:
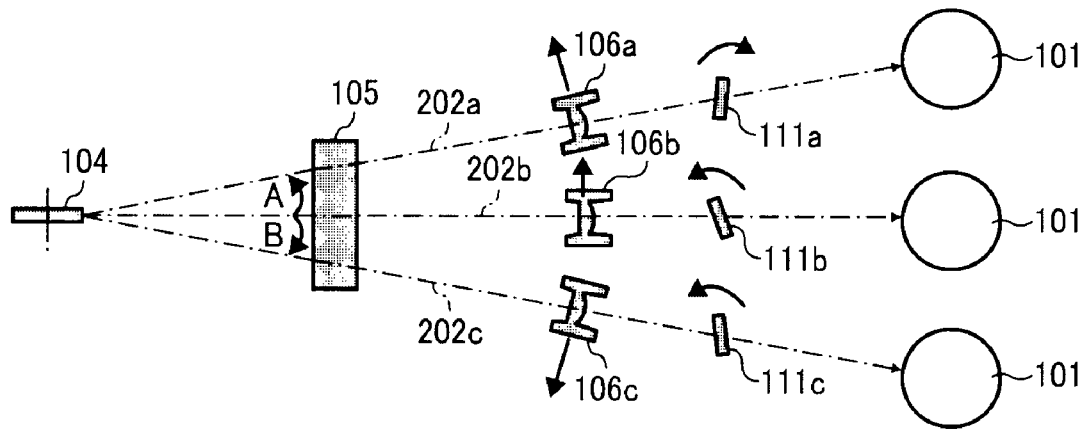
FIG. 6 is a schematic view illustrating relative positions of a polygon mirror, scanning optics systems, and glass plates of yet another embodiment of the optical scanning device of the present invention, and photoreceptors to be scanned.

As illustrated in FIG. 6, the glass plate 111a provided for the oblique incidence optical system for the light beam 202a is preferably slanted in a direction opposite to the slanting direction of the glass plate 111b for the horizontally incident light beam 202b, in which the second lens 106b is arranged in the same way as that of the second lens 106a in the oblique incidence optical system.

In addition, as also illustrated in FIG. 6, the glass plate 111c provided for the oblique incidence optical system for the light beam 202c is preferably slanted in the same direction as the slanting direction of the glass plate 111b for the horizontally incident light beam 202b, in which the second lens 106b is arranged in the opposite direction as that of the second lens 106c in the oblique incidence optical system.

As mentioned above, in the optical system for the horizontally incident light beam 202b, scanning line bending is caused by the second lens 106b. In this regard, it is preferable that the amount of scanning line bending be as small as possible. Therefore, it is preferable that the amount of correction of scanning line bending caused by the special scanning surface of the second lens 106b be as small as possible. Since a lens having the same form is used for the second lenses 106a, 106b and 106c, it is preferable that the amount of scanning line bending caused in the oblique incidence optical systems for the light beams 202a and 202c be as small as possible. Therefore, it is preferable that the oblique incidence angle (i.e., angle α in FIG. 4C) be as low as possible. Therefore, it is preferable to use a combination of obliquely incident light beams (such as light beams 202a and 202c) and a horizontally incident light beam 202b or the like.

Further, the amount of scanning line bending can be decreased when the slanting directions of the glass plates 111a and 111c for the obliquely incident light beams 202a and 202c and the slanting direction of the glass plate 111b for the horizontally incident light beam 202b satisfy the above-mentioned relation.

Specifically, the relation is as follows. In such a combination of an oblique incidence optical system for the light beam 202a and a horizontal incidence optical system for the light beam 202b as illustrated in FIG. 6 in which the second lenses 106a and 106b are arranged in the same direction, the glass plate 111b provided for the horizontal incidence optical system for the light beam 202b is preferably slanted in the same direction as the reflection direction (i.e., direction A in FIG. 6) of the light beam 202a. By contrast, the slanting direction of the glass plate 111a provided for the oblique incidence optical scanning system for the light beam 202a is preferably slanted in a direction opposite to the slanting direction of the glass plate 111b.

By contrast, in such a combination of an oblique incidence optical scanning system for the light beam 202c and a horizontal incidence optical system for the light beam 202b as illustrated in FIG. 6 in which the second lenses 106c and 106b are arranged in the opposite directions, the glass plate 111b provided for the horizontally incident light beam 202b is preferably slanted in the opposite direction as the reflection direction (i.e., direction B in FIG. 6) of the light beam 202c at the reflection surface of the polygon mirror 104. In addition, the slanting direction of the glass plate 111c provided for the oblique incidence optical scanning system for the light beam 202c is preferably slanted in the same direction as the slanting direction of the glass plate 111b.

As mentioned above, the glass plate 111b is set so as to cause scanning line bending in the opposite direction to the direction of scanning line bending caused by the second lens 106b. Namely, the glass plate 111b is set so as to cause scanning line bending in the same direction as the direction of scanning line bending caused in an oblique incidence optical system.

Therefore, by slanting the glass plate 111a for the oblique incidence optical system in the opposite direction to the slanting direction of the glass plate 111b, scanning line bending in the opposite direction to the direction of scanning line bending caused in the oblique incidence optical system is caused, thereby correcting scanning line bending caused in the oblique incidence optical system.

As a result, the amount of scanning line bending caused in the oblique incidence optical system can be decreased, and the amount of correction of scanning line bending made by the second lens 106a can be decreased. By using the second lens 106a as the second lens 106b, the amount of scanning line bending caused in the horizontal incidence optical system (i.e., scanning line bending of the light beam 202b) can be decreased, and thereby correction of scanning line bending can be effectively made by the glass plate 111b.

Although it is difficult to perfectly cancel scanning line bending, which is caused by the second lens 106b, with the glass plate 111b, it is possible to reduce the amount of correction of scanning line bending, which is made by the second lens 106a or 106b, by properly adjusting the slanting conditions of the glass plate 111a and the glass plate 111b. Similarly, it is possible to reduce the amount of correction of scanning line bending, which is made by the second lens 106c or 106b, by properly adjusting the slanting conditions of the glass plate 111c and the glass plate 111b.

In Embodiments mentioned below, the glass plate 111a for the oblique incidence optical system is slanted at 10° relative to an axis perpendicular to the moving direction of the light beam 202a, and the glass plate 111b for the horizontal incidence optical system is slanted in the opposite direction at 20° relative to an axis perpendicular to the moving direction of the light beam 202b. As a result, a good optical property such that the amounts of scanning line bending in the oblique incidence optical system and the horizontal incidence optical system are substantially 0 can be obtained.

The absolute value of the slanting angle of the glass plate 111b is preferably equal to the absolute value of the slanting angle of the glass plate 111a. When the glass plate 111a is maximally slanted within a range in which no problem is caused in the oblique incidence optical system, the amount of correction of scanning line bending made by the second lens 106a is minimal. In this case, since the amount of scanning line bending caused by the second lens 106b of the horizontal incidence optical system is also small, scanning line bending in the horizontal incidence optical system is minimized by maximally slanting the glass plate 111b within a range in which no problem is caused.

As mentioned above, the amount of scanning line bending caused by the special scanning surface of the second lens 106a in the oblique incidence optical system to correct scanning line bending therein is larger than that caused by the glass plate 111a. In this regard, the larger oblique incidence angle the obliquely incident light beam has, the larger scanning line bending the oblique incidence optical system causes. Namely, in order to perfectly correct scanning line bending, it is necessary to relatively largely slant the glass plate in the horizontal incidence optical system compared to the glass plate in the oblique incidence optical system. However, when the oblique incidence angle α is large, the amount of scanning line bending becomes large, and thereby the amount of correction made by the second lens is increased. As a result, the amount of scanning line bending caused by the second lens 106b in the horizontal incidence optical system is increased. In the optical scanning device of the present invention, the amount of correction of scanning line bending in the oblique incidence optical system is minimized. Therefore, the slanting angle of the glass plate is set to the maximum angle within a range in which no problem is caused. As a result, the amount of scanning line bending caused by the second lens 106b in the horizontal incidence optical system is minimized. Even when the glass plate 111a in the oblique incidence optical system is maximally slanted to minimize the amount of correction of scanning line bending to be made by the second lens 106a (or 106b), the glass plate 111b is preferably slanted at an angle greater than that of the glass plate 111a. However, since the slanting angle of the glass plate 111a is maximal, it is preferable that the absolute values of the slanting angles of the glass plates 111a and 111b are set to the maximum value in an angle range in which no problem is caused. Therefore, when the oblique incidence angle α is relatively large, scanning line bending is not perfectly corrected but can be minimized in the horizontal incidence optical system.

The light source of the optical scanning device of the present invention is preferably a multi-beam light source such as a laser diode array having multiple luminous points, and a combination multi-beam light source including multiple light sources each having one or more luminous points so that the surfaces of multiple photoreceptors be scanned with multiple light beams emitted therefrom. By using such a light source for the optical scanning device and the image forming apparatus of the present invention, the optical scanning device and the image forming apparatus can produce the above-mentioned effect, thereby making it possible to produce high density electrophotographic images and high density visible images at a high speed.

Next, an embodiment of the image forming apparatus of the present invention including the optical scanning device of the present invention will be described with reference to FIG. 7.

Figure 7:
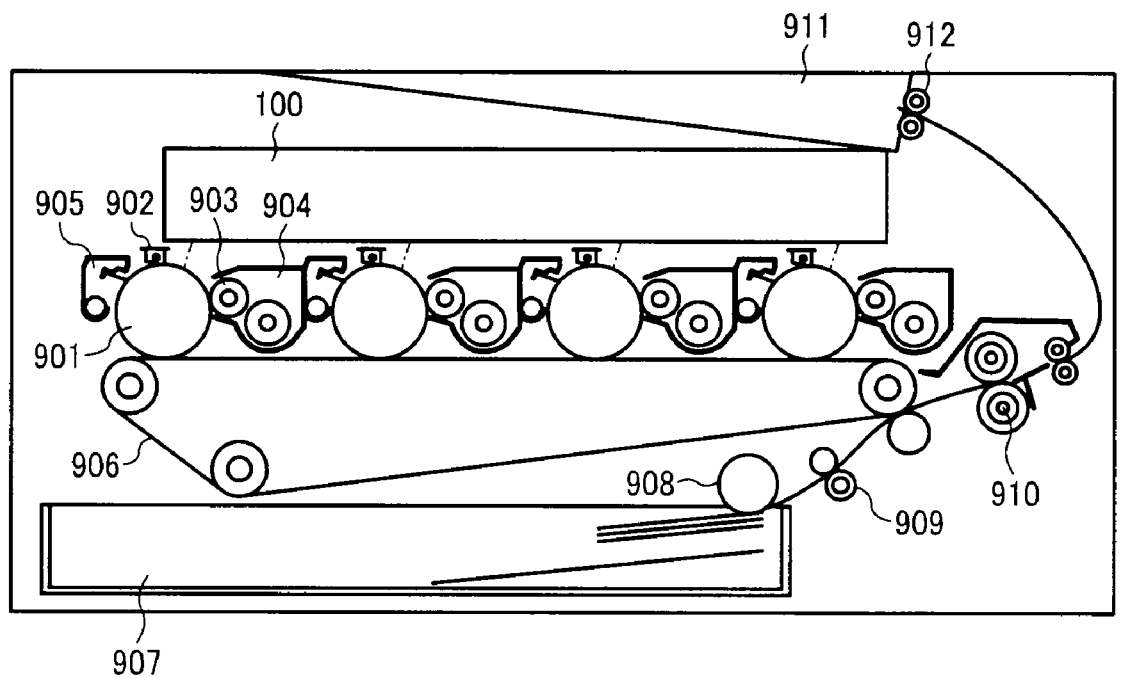
FIG. 7 is a cross-sectional view illustrating an embodiment of the image forming apparatus of the present invention.

The image forming apparatus illustrated in FIG. 7 is a tandem full color laser printer to which the optical scanning device of the present invention is applied and which has four photoreceptors.

Referring to FIG. 7, the tandem full color laser printer has four image forming stations, each of which has a photoreceptor drum 901, and a charger 902 configured to charge the surface of the photoreceptor, a developing device 904 having a developing roller 903 and containing a developer including a color toner (yellow, magenta, cyan or black color toner) to develop an electrostatic latent image, which is formed on the photoreceptor by scanning the charged surface of the photoreceptor with a light beam emitted by the optical scanning device 100, with the developer to form a color toner image on the photoreceptor, and a cleaner 905 configured to clean the surface of the photoreceptor, which devices are arranged around the photoreceptor.

The four image forming stations are arranged side by side along an intermediate transfer belt 906, and the yellow, magenta, cyan and black color toner images formed on the four photoreceptors 901 are timely transferred sequentially onto the surface of the intermediate transfer belt so as to be overlaid, thereby forming a combined multi-color toner image on the intermediate transfer belt. The four image forming stations have substantially the same configuration except that the color of the toner is different.

A stack of recording sheets is set in a sheet tray 907, and an uppermost sheet is fed by a feeding roller 908 to a pair of registration rollers 909. The recording sheet is stopped once by the pair of registration rollers 909, and then timely fed so that the combined multi-color toner image formed on the intermediate transfer belt 906 is transferred onto the recording sheet at a secondary transfer position, at which a roller supporting the intermediate transfer belt is opposed to a roller with the intermediate transfer belt therebetween. The recording sheet bearing the combined multi-color toner image thereon is then fed to a fixing device 910 to fix the combined multi-color toner image on the recording sheet, resulting in formation of a full color image. The recording sheet bearing the full color image thereon is then discharged to a copy tray 911 by a pair of discharging rollers 912.

Figure 8:
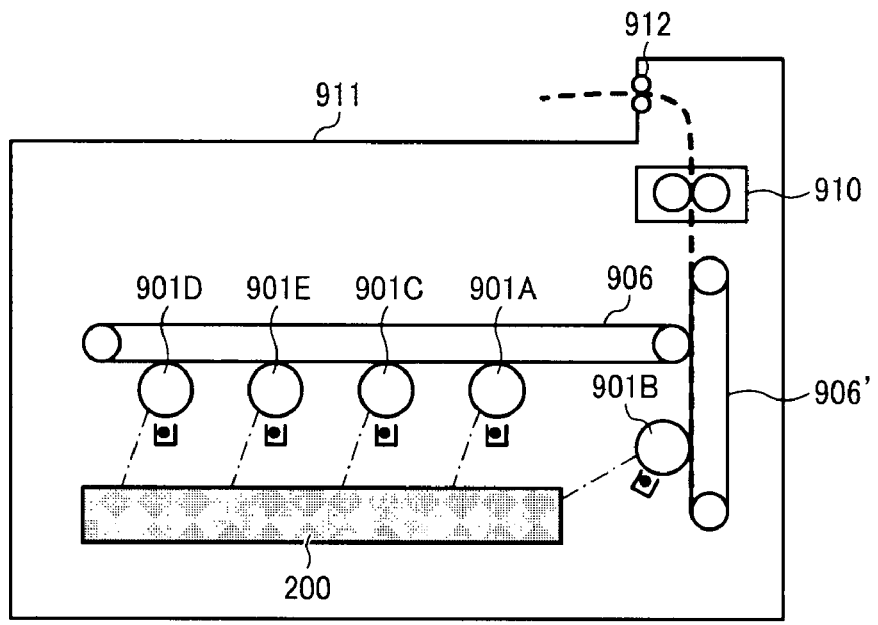
FIG. 8 is a cross-sectional view illustrating another embodiment of the image forming apparatus of the present invention.

Another embodiment of the image forming apparatus, which has five photoreceptors, is illustrated in FIG. 8.

In the image forming apparatus, four image forming stations including respective photoreceptor drums 901A, 901C, 901E and 901D are arranged similarly to the image forming apparatus illustrated in FIG. 7, and color toner images formed on the photoreceptor drums are transferred onto a recording sheet via the intermediate transfer belt 906. Another image forming station having a photoreceptor drum 901B is provided upstream from the secondary transfer position, at which the intermediate transfer belt 906 is contacted with a feeding belt 906', relative to the recording sheet moving direction. Similarly to the four image forming stations illustrated in FIG. 7, the charger, the developing device, and the cleaner are arranged around the photoreceptor drums, 901A, 901C, 901E, 901D and 901B, although the devices are not illustrated in FIG. 8. An optical scanning device 200 of the present invention irradiates the five photoreceptor drums 901A-901E to form an electrostatic latent image on each photoreceptor drum.

The image forming apparatus illustrated in FIG. 8 performs an image forming operation in which at first a color toner image is directly transferred on a recording sheet from the fifth photoreceptor drum 901B, and a combined multi-color toner image formed on the intermediate transfer belt 906 is then transferred onto the recording sheet at the secondary transfer position. In this regard, residual toner remaining on the fifth photoreceptor drum 901B can be prevented from being mixed with other toners, and it become possible to collect and reuse the residual toner. It is preferable to use a black toner for the fifth photoreceptor drum 901B because monochrome (black and white) images are frequently produced even in full color image forming apparatuses, and a good toner reusing effect (i.e., a good material saving effect) can be produced.

Figure 9:
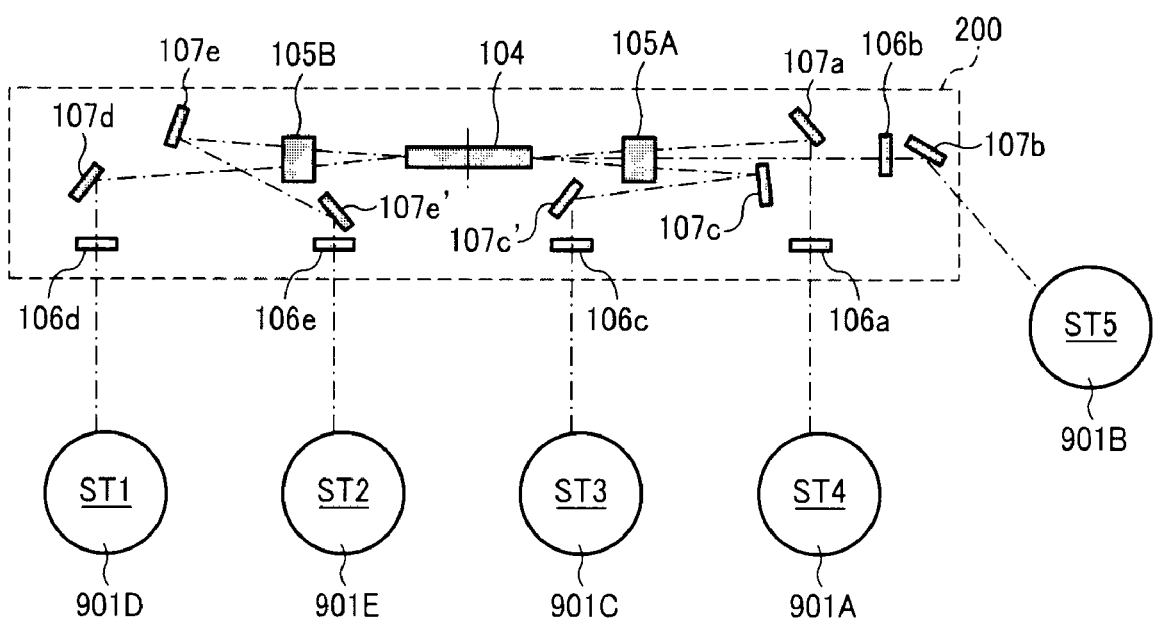
FIG. 9 is a cross-sectional view illustrating the optical scanning device of the image forming apparatus illustrated in FIG. 8.

FIG. 9 illustrates the optical scanning device 200 of the image forming apparatus illustrated in FIG. 8.

Referring to FIG. 9, the optical scanning device 200 has the polygon mirror 104 in substantially the center thereof, and has a first lens 105A serving as a common lens, the second lenses 106a, 106b and 106c serving as individual lenses, and reflecting mirrors 107a, 107b, 107c and 107c', which are arranged on the right side of the polygon mirror. In addition, the optical scanning device 200 has another first lens 105B serving as a common lens, another second lenses 106d and 106e serving as individual lenses, and reflecting mirrors 107d, 107e and 107e', which are arranged on the left side of the polygon mirror 104. Further, glass plates (not shown in FIG. 9) are arranged at locations between the respective second lenses 106 and photoreceptor drums 901 on the respective light paths.

Five light beams emitted from a light source (not shown in FIG. 9) irradiate the respective photoreceptor drums 901A-901E through the following passages 1-5.

Passage 1: polygon mirror 104→first lens 105A→reflecting mirror 107a→second lens 106a→glass plate (111)→photoreceptor drum 901A Passage 2: polygon mirror 104→first lens 105A→second lens 106b→reflecting mirror 107b→glass plate (111)→photoreceptor drum 901B Passage 3: polygon mirror 104→first lens 105A→reflecting mirror 107c→reflecting mirror 107c'→second lens 106c→glass plate (111)→photoreceptor drum 901C Passage 4: polygon mirror 104→first lens 105B→reflecting mirror 107d→second lens 106d→glass plate (111)→photoreceptor drum 901D Passage 5: polygon mirror 104→first lens 105B→reflecting mirror 107e→reflecting mirror 107e'→second lens 106e→glass plate (111)→photoreceptor drum 901E In this regard, the passages 1 and 3-5 are oblique incidence optical scanning systems, and the passage 2 is a horizontal incidence optical scanning system. By using such systems, the above-mentioned effects of the present invention can produced.

Hereinbefore, the slanting direction of a glass plate is described while omitting a reflecting mirror (as illustrated in FIG. 5). Namely, the effect of the present invention is described assuming that for each of a horizontally incident light beam and obliquely incident light beams, only a second lens (individual lens) and a glass plate are arranged at locations between the first lens 105 and photoreceptor drums 901 while omitting a reflecting mirror. The same effect can be produced even when a reflecting mirror is additionally set in the optical scanning systems.

Having generally described this invention, further understanding can be obtained by reference to certain specific embodiments which are provided herein for the purpose of illustration only and are not intended to be limiting.

Embodiment

Hereinafter, the optical scanning device 200 of the present invention will be described using tangible data. This optical scanning device uses the light source illustrated in FIG. 1.

At first, conditions of the optical scanning device 200 will be described. The laser diode 201 emits a light beam having a wavelength of 780 nm, and the light beam is converted to substantially parallel light by a coupling lens 203 having a focal length of 10 mm at 780 nm. Next, the light beam is focused on a reflection surface of the polygon mirror 104 by the cylindrical lens 103 having a curvature radius of 74.9 mm at the incident surface thereof in the sub-scanning direction and a thickness of 3 mm, so that an optical line extending in the main scanning direction is formed (focused) on the reflection surface of the polygon mirror.

The polygon mirror 104 used for the optical scanning device is a hexagonal cylinder having six reflection surfaces and a size such that the distance between two opposed reflection surfaces is 26 mm (i.e., the incircle of the hexagonal surface of the polygon mirror has a radius of 13 mm).

The obliquely incident light beam 202a (or 202c) is incident on the reflection surface at an incidence angle of 1.4° in the sub-scanning direction relative to the normal line of the surface, and is commonly used for plural light beams. The obliquely incident light beams 202a and 202c are incident on the first lens 105 at an angle of +1.46° or −1.46°, and the horizontally incident light beam 202b is incident vertically to the first lens 105. The horizontally incident light beam 202b passes through substantially the center of the first lens 105 in the sub-scanning direction, and the obliquely incident light beams 202a and 202c pass through the first lens while apart from the axis thereof.

The second lens 106 having two surfaces 3 and 4 (described in Table 1 below) is arranged in such a manner that light beam passes the optical axis of the lens. Namely, the second lens 106 for the obliquely incident light beam is slanted at an angle of +1.46° or −1.46° while the second lens for the horizontally incident light beam is not slanted (i.e., the second lens for the horizontally incident light beam is arranged similarly to the first lens 105).

The data of the first lens 105 and the second lens 106 are illustrated in Table 1 below.

TABLE 1

| | First lens (commonly used lens) | | Second lens 106 (individual lens) | |
|---|---|---|---|---|
| | First surface (incident surface) | Second surface | Third surface (incident surface) | Fourth surface |
| Cm | −75.90 | −48.80 | −374.16 | −965.51 |
| K | 0.0000E+00 | 0.0000E+00 | 0.0000E+00 | 0.0000E+00 |
| A | −6.3314E−07 | −2.1200E−07 | 1.0954E−07 | −1.6879E−08 |
| B | 1.9352E−09 | 7.4465E−10 | 1.6098E−11 | 1.5436E−12 |
| C | −1.8952E−12 | 1.7871E−15 | 2.3421E−15 | −8.8591E−17 |
| D | 1.7922E−16 | 4.7706E−16 | 1.9357E−19 | 7.1835E−22 |
| E | −4.8303E−18 | −4.6236E−18 | 7.1345E−24 | 3.5568E−25 |
| Rz | ∞ | ∞ | 34.73 | ∞ |
| a | — | −1.4720E−06 | — | — |
| b | — | 1.2906E−05 | −5.8610E−07 | — |
| c | — | −2.3629E−08 | — | — |
| d | — | −1.5519E−09 | 1.1386E−10 | — |
| e | — | −6.5071E−13 | — | — |
| f | — | −4.9930E−12 | −6.9238E−14 | — |
| g | — | 2.0754E−13 | — | — |
| h | — | 8.5324E−14 | 2.1764E−17 | — |
| i | — | −4.1816E−16 | — | — |
| j | — | −1.4362E−16 | −3.2939E−21 | — |
| k | — | 4.3367E−19 | — | — |
| l | — | −8.0058E−20 | 1.9807E−25 | — |
| m | — | −4.3352E−22 | — | — |
| n | — | 1.6673E−22 | 1.2118E−30 | — |
| o | — | — | — | — |
| p | — | — | −4.0474E−34 | — |
| F0 | — | — | — | — |
| F1 | — | — | — | — |
| F2 | — | — | — | −5.1213E−08 |
| F3 | — | — | — | — |
| F4 | — | — | — | −4.0800E−11 |
| F5 | — | — | — | — |
| F6 | — | — | — | 3.7366E−14 |
| F7 | — | — | — | — |
| F8 | — | — | — | −1.4373E−17 |
| F9 | — | — | — | — |
| F10 | — | — | — | 2.5215E−21 |
| F11 | — | — | — | — |
| F12 | — | — | — | −1.6355E−25 | reflection surface. In addition, the incident angle of the obliquely incident light beam in the main scanning direction is about 60° relative to a light beam traveling to a point with image height of 0. The aperture 204 regulating the light beam emerging from the coupling lens 203 is a rectangular aperture having a length of 4.8 mm in the main scanning direction and a length of 1.08 mm in the sub-scanning direction.

The first lens 105 having two surfaces 1 and 2 (described in Table 1 below) is arranged so as to be parallel to the reflection Each of the second surface and the third surface is a surface in which the curvature of the surface in the sub-scanning direction changes in the main scanning direction and which is represented by the following equation (2).

$$X(Y, Z) = Y^2 \cdot Cm / \{1 + \sqrt{[1-(1+K)\cdot(Y\cdot Cm)^2]}\} + A \cdot Y^4 + B \cdot Y^6 + C \cdot Y^8 + D \cdot Y^{10} + E \cdot Y^{12} \ldots + Cs(Y) \cdot Z^2 / \{1 + \sqrt{[1-(Cs(Y)\cdot Z)^2]}\} \quad (2)$$

In equation (2), $Cm = 1/RY$, and $Cs(Y) = 1/RZ + aY + bY^2 + cY^3 + dY^4 + eY^5 + fY^6 + gY^7 + hY^8 + iY^9 + jY^{10} \ldots$ RY represents a paraxial curvature radius in a main scanning cross-sectional plane which is parallel to a flat cross-sectional plane including the optical axis, Y represents a distance from the optical axis in the main scanning direction, each of A, B, C, D, . . . represents a high degree coefficient, and RZ represents a paraxial curvature radius in a sub-scanning cross-sectional plane perpendicular to the main scanning cross-sectional plane.

The first surface of the first lens has no curvature in the sub-scanning direction and has a non-circular arc form in the main scanning direction at any portions of the surface. The fourth surface of the second lens is the special scanning surface mentioned above and corrects scanning line bending.

The data of the scanning lenses of the oblique incidence optical scanning systems and the horizontal incidence optical scanning system are shown in Table 1. In this regard, the second lenses 106a and 106c of the oblique optical systems for the light beams 202a and 202c respectively having incidence angles of +1.46° and −1.46° are arranged in such a manner that the special scanning surface of the second lens 106c is opposite to that of the second lens 106a in the sub-scanning direction. The second lenses serve as individual lenses 106 of the scanning optics system 110 illustrated in FIG. 1A.

The positional data of the optical elements of the optical scanning device are shown in Table 2 below. In this regard, the distance X means a distance between lenses in the optical axis direction of the first lens 105 when the lenses are projected on a plane perpendicular to the rotation axis of the polygon mirror 104.

TABLE 2

|  | Distance X (mm) |
| --- | --- |
| Reflection surface of polygon mirror - incidence surface of first lens | 37.5 |
| Thickness of first lens | 5 |
| Beam emerging surface of first lens - incidence surface of second lens | 161 |
| Thickness of second lens | 3 |
| Beam emerging surface of second lens - surface of member to be scanned | 97 |

The slanting angle of the glass plate 111a provided for the obliquely incident light beam 202a, which has an incidence angle (α) of +1.46°, relative to the axis perpendicular to the moving direction of the beam is +10°, the slanting of the glass plate 111c provided for the obliquely incident light beam 202c, which has an incidence angle (α) of −1.46°, relative to the axis perpendicular to the moving direction of the beam is −10°, and the slanting angle of the glass plate 111b provided for the horizontally incident light beam 202b relative to the axis perpendicular to the moving direction of the beam is −20°. In this regard, the positive sign (+) of slanting angle of the glass plate means the clockwise rotation, and negative sign (−) means the counterclockwise rotation.

The cross-section (in the sub-scanning direction) of this embodiment of the optical scanning device, for which the above-mentioned lenses are used, is illustrated in FIG. 6. In this regard, the light path of a light beam from a light source to the polygon mirror is not illustrated in FIG. 6.

An embodiment of the optical scanning device, i.e., the optical scanning device 200, for scanning the surfaces of five photoreceptors is illustrated in FIG. 9, although the glass plates 111 are not illustrated. The optical scanning systems illustrated in FIG. 6 correspond to the optical scanning systems provided on the right side of the polygon mirror 104 illustrated in FIG. 9.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2009-212691, filed on Sep. 15, 2009, the entire contents of which are herein incorporated by reference.

What is claimed is:

1. An optical scanning device, comprising:
   a light source configured to emit multiple light beams;
   an optical deflecting device having a reflection surface on which the multiple light beams emitted by the light source are incident and from which the multiple light beams are reflected to be deflected;
   a plurality of members to be scanned, each member to be scanned by one of the multiple light beams;
   multiple scanning optics systems, each of the multiple scanning optics systems configured to focus one of the deflected multiple light beams on a surface of the member to be scanned while scanning the surface with the focused one of the deflected multiple light beams in a main scanning direction; and
   multiple glass plates located between the multiple scanning optics systems and the members to be scanned and disposed on light paths of corresponding light beams, each of the glass plates having no refracting power in the main scanning direction and a sub-scanning direction perpendicular to the main scanning direction, and slanted at a slanting angle relative to an axis perpendicular to the light path of the corresponding light beam,
   wherein the multiple light beams include two or more light beams having different incidence angles in the sub-scanning direction relative to a normal line of the reflection surface, and the slanting angles of the glass plates are determined depending on the incidence angles of the corresponding light beams passing through the glass plates.

2. The optical scanning device according to claim 1, wherein the multiple light beams include a first light beam obliquely incident on the reflection surface at an incidence angle relative to the normal line of the reflection surface, and a second light beam incident on the reflection surface in parallel with the normal line of the reflection surface,
   wherein each of the multiple scanning optics systems includes a plurality of identically shaped individual lenses, each of which has a special scanning surface asymmetric in the sub-scanning direction, for the corresponding light beam,
   wherein individual lenses for first and second light beams and glass plates for the first and second light beams are arranged between the optical deflecting device and the members to be scanned by the first and second light beams, and are disposed on the paths of the corresponding first and second light beams, and
   wherein, when the individual lenses for the first and second light beams are set such that the special scanning surfaces thereof face in a same direction, a clock oriented direction of slanting of the glass plate for the second light beam relative to an axis perpendicular to the light path of the second light beam is toward a clock oriented direction of reflection of the first light beam reflected from the reflection surface relative to the second light beam reflected from the reflection surface, and when the individual lenses for the first and second light beams are set such that the special scanning surfaces thereof face in opposite directions in the sub-scanning direction, the clock oriented direction of slanting of the glass plate for the second light beam relative to the axis perpendicular to the light path of the second light beam is away from the clock oriented direction of reflection of the first light beam relative to the second light beam reflected from the reflection surface.

3. The optical scanning device according to claim 2, wherein when the individual lenses for the first and second light beams are set such that the special scanning surfaces thereof face in the same direction, a clock oriented direction of slanting of the glass plate for the first light beam relative to an axis perpendicular to the light path of the first light beam is away from the clock oriented direction of slanting of the glass plate for the second light beam.

4. The optical scanning device according to claim 3, wherein absolute values of slanting angles of the glass plates for the first and second light beams are the same.

5. The optical scanning device according to claim 2, wherein when the individual lenses for the first and second light beams are set such that the special scanning surfaces thereof face in opposite directions, a clock oriented direction of slanting of the glass plate for the first light beam relative to an axis perpendicular to the light path of the first light beam is toward the clock oriented direction of slanting of the glass plate for the second light beam.

6. The optical scanning device according to claim 5, wherein absolute values of slanting angles of the glass plates for the first and second light beams are the same.

7. The optical scanning device according to claim 1, wherein the multiple light beams include a first oblique light beam obliquely incident on the reflection surface at a positive angle to the normal line of the reflection surface, and a second oblique light beam obliquely incident on the reflection surface at a negative angle to the normal line of the reflection surface, and wherein a clock oriented direction of slanting of a glass plate for the first oblique light beam relative to an axis perpendicular to the light path of the first oblique light beam is away from a clock oriented direction of slanting of a glass plate for the second oblique light beam relative to an axis perpendicular to the light path of the second oblique light beam.

8. The optical scanning device according to claim 1, wherein the light source is a multi-beam emitting device emitting multiple light beams.

9. An image forming apparatus comprising:
multiple image bearing members; and
the optical scanning device according to claim 1, configured to scan surfaces of the multiple image bearing members with corresponding multiple light beams to form an electrostatic latent image on each of the image bearing members.

10. The optical scanning device according to claim 1, wherein the at least one light beam is obliquely incident on the reflection surface at an oblique incidence angle of 1.4° relative to the normal line of the reflection surface.

11. The optical scanning device according to claim 1, wherein the multiple light beams include a first light beam obliquely incident on the reflection surface at an incidence angle relative to the normal line of the reflection surface, a second light beam incident on the reflection surface in parallel with the normal line of the reflection surface, and a third light beam obliquely incident on the reflection surface at an incidence angle relative to the normal line of the reflection surface.

12. The optical scanning device according to claim 11, wherein the first light beam is obliquely incident on the reflection surface at an incidence angle of 1.4° relative to the normal line of the reflection surface, and the third light beam is obliquely incident on the reflection surface at an incidence angle of −1.4° relative to the normal line of the reflection surface.

13. The optical scanning device according to claim 1, wherein each of the multiple scanning optics systems includes a plurality of identically shaped individual lenses, each of which has a special scanning surface asymmetric in the sub-scanning direction, for the corresponding light beam.

14. The optical scanning device according to claim 1, wherein each of the multiple scanning optics systems includes a plurality of identically shaped individual lenses, and individual lenses for first and second light beams and glass plates for the first and second light beams are arranged between the optical deflecting device and the members to be scanned by the first and second light beams, and are disposed on the paths of the corresponding first and second light beams, and wherein, when the individual lenses for the first and second light beams are set such that special scanning surfaces thereof face in a same direction, a clock oriented direction of slanting of the glass plate for the second light beam relative to an axis perpendicular to the light path of the second light beam is toward a clock oriented direction of reflection of the first light beam reflected from the reflection surface relative to the second light beam reflected from the reflection surface, and when the individual lenses for the first and second light beams are set such that the special scanning surfaces thereof face in opposite directions in the sub-scanning direction, the clock oriented direction of slanting of the glass plate for the second light beam relative to the axis perpendicular to the light path of the second light beam is away from the clock oriented direction of reflection of the first light beam relative to the second light beam reflected from the reflection surface.

15. The optical scanning device according to claim 1, wherein the optical deflecting device includes only one or two tiers in the sub-scanning direction, a single tier including the reflection surface on which the multiple light beams emitted by the light source are incident and from which the multiple light beams are reflected to be deflected.

* * * * *